United States Patent
Li et al.

(10) Patent No.: US 12,538,038 B2
(45) Date of Patent: Jan. 27, 2026

(54) IMAGE ACQUISITION METHOD AND DEVICE, AND ELECTRONIC DEVICE

(71) Applicant: BOE TECHNOLOGY GROUP CO., LTD., Beijing (CN)

(72) Inventors: Yapeng Li, Beijing (CN); Xue Dong, Beijing (CN); Lei Wang, Beijing (CN); Yangbing Li, Beijing (CN); Yuanyuan Ma, Beijing (CN); Wenhao Tian, Beijing (CN); Mingdong Wang, Beijing (CN); Xuan Feng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 184 days.

(21) Appl. No.: 18/550,971

(22) PCT Filed: Feb. 22, 2023

(86) PCT No.: PCT/CN2023/077669
§ 371 (c)(1),
(2) Date: Sep. 18, 2023

(87) PCT Pub. No.: WO2023/202210
PCT Pub. Date: Oct. 26, 2023

(65) Prior Publication Data
US 2025/0039563 A1    Jan. 30, 2025

(30) Foreign Application Priority Data

Apr. 19, 2022 (CN) .......................... 202210410828.9

(51) Int. Cl.
*H04N 23/90* (2023.01)
*G06F 3/01* (2006.01)
*H04N 23/611* (2023.01)

(52) U.S. Cl.
CPC ............. *H04N 23/90* (2023.01); *G06F 3/013* (2013.01); *H04N 23/611* (2023.01)

(58) Field of Classification Search
CPC ............................ H04N 23/90; H04N 23/611
See application file for complete search history.

(56) References Cited

U.S. PATENT DOCUMENTS

2018/0020201 A1*   1/2018   Motta ..................... G06F 3/012
2018/0077384 A1    3/2018   Goldman et al.
(Continued)

FOREIGN PATENT DOCUMENTS

CN    109479114 A    3/2019
CN    110809115 A    2/2020
(Continued)

OTHER PUBLICATIONS

Office Action for the Chinese Patent Application No. 202210410828.9 issued by the Chinese Patent Office on Oct. 31, 2023.

*Primary Examiner* — Jerry T Jean Baptiste
(74) *Attorney, Agent, or Firm* — XSENSUS LLP

(57) ABSTRACT

An image acquisition method applied to a first electronic device, and the first electronic device includes N first cameras, N being an integer greater than or equal to 3. The image acquisition method includes: firstly, receiving, by the first electronic device, first position information from a second electronic device, the first position information being position information of eyes of a viewer of the second electronic device; then, selecting, by the first electronic device, K first cameras from the N first cameras based on the first position information, K being an integer greater than or equal to 2 and less than N; then, acquiring, by the first electronic device, images by using the K first cameras.

18 Claims, 13 Drawing Sheets

(56) References Cited

U.S. PATENT DOCUMENTS

| | | |
|---|---|---|
| 2019/0320142 A1 | 10/2019 | Cutler |
| 2020/0357155 A1 | 11/2020 | Casella et al. |
| 2021/0021784 A1 | 1/2021 | Cutler |
| 2023/0276115 A1* | 8/2023 | Agrawal .............. H04N 23/695 348/333.03 |

FOREIGN PATENT DOCUMENTS

| | | |
|---|---|---|
| CN | 111989914 A | 11/2020 |
| CN | 112584080 A | 3/2021 |
| CN | 113038111 A | 6/2021 |
| CN | 113139992 A | 7/2021 |
| CN | 213693932 U | 7/2021 |
| CN | 113508361 A | 10/2021 |
| CN | 113568595 A | 10/2021 |
| CN | 113989432 A | 1/2022 |
| CN | 114827465 A | 7/2022 |

* cited by examiner (a)

(b)

(a)

(b)

IMAGE ACQUISITION METHOD AND DEVICE, AND ELECTRONIC DEVICE

CROSS-REFERENCE TO RELATED APPLICATIONS

This application is a national phase entry under 35 USC 371 of International Patent Application No. PCT/CN2023/077669, filed on Feb. 22, 2023, which claims priority to Chinese Patent Application No. 202210410828.9, filed on Apr. 19, 2022, which are incorporated herein by reference in their entirety.

TECHNICAL FIELD

The present disclosure relates to the field of image acquisition technologies, and in particular, to an image acquisition method, an image acquisition device, and an electronic device.

BACKGROUND

By recording higher-dimensional light data, the optical field can obtain higher-precision three-dimensional information than traditional two-dimensional imaging and traditional three-dimensional imaging represented by binocular stereo vision, so as to accurately perceive the dynamic environment. In video communication scenarios, by acquiring optical field videos, multiple users of video communication can experience each other's faces and voices more realistically.

SUMMARY

In an aspect, an image acquisition method is provided, which is applied to a first electronic device, and the first electronic device includes N first cameras, N being an integer greater than or equal to 3. The image acquisition method includes: firstly, receiving, by the first electronic device, first position information from a second electronic device, the first position information being position information of eyes of a viewer of the second electronic device; then, selecting, by the first electronic device, K first cameras from the N first cameras based on the first position information, K being an integer greater than or equal to 2 and less than N; then, acquiring, by the first electronic device, images by using the K first cameras.

In some embodiments, an implementation of selecting, by the first electronic device, the K first cameras from the N first cameras based on the first position information includes: based on a projected position of second position information on an upper border and/or a lower border of the first electronic device, selecting, by the first electronic device, the K first cameras closest to the projected position from the N first cameras, the second position information being a corresponding position of the first position information on a display of the first electronic device.

In some embodiments, the display of the first electronic device is divided into J triangular regions by the N first cameras, J being an integer greater than or equal to N; when the second position information is located in a first region in the J triangular regions, the K first cameras are first cameras located at three vertices of a smallest triangular region that includes the first region.

In some embodiments, the first electronic device further includes M second cameras, M being an integer greater than or equal to 1. The image acquisition method further includes: firstly, acquiring, by the first electronic device, third position information through the M second cameras, the third position information being position information of eyes of a viewer of the first electronic device; then, transmitting, by the first electronic device, the third position information to the second electronic device.

In some embodiments, the N first cameras are arranged on an upper border and/or a lower border of the first electronic device.

In some embodiments, the M second cameras are arranged at a middle position of an upper border and/or a lower border of the first electronic device.

In some embodiments, the N first cameras include at least one of color cameras or depth cameras.

In some embodiments, the M second cameras are depth cameras, and the M second cameras include at least one of time-of-flight cameras, binocular stereo cameras or structured light stereo cameras.

In another aspect, an image acquisition device is provided, and the image acquisition device includes N first cameras, N beng an integer greater than or equal to 3. The image acquisition device is configured to: firstly, receive first position information from a second electronic device, the first position information being position information of eyes of a viewer of the second electronic device; then, select K first cameras from the N first cameras based on the first position information, K being an integer greater than or equal to 2 and less than N; then, acquire images by using the K first cameras.

In some embodiments, the image acquisition device is further configured to: based on a projected position of second position information on an upper border and/or a lower border of a display of the image acquisition device, select the K first cameras closest to the projected position from the N first cameras, the second position information being a corresponding position of the first position information on the display of the image acquisition device.

In some embodiments, the image acquisition device further includes the display, and the display is divided into J triangular regions by the N first cameras, J being an integer greater than or equal to N. When second position information is located in a first region in the J triangular regions, the K first cameras are first cameras located at three vertices of a smallest triangular region that includes the first region.

In some embodiments, the image acquisition device further includes M second cameras, M being an integer greater than or equal to 1, and the image acquisition device is further configured to: firstly, acquire third position information through the M second cameras, the third position information being position information of eyes of a viewer of the image acquisition device; then, transmit the third position information to the second electronic device.

In some embodiments, the N first cameras are arranged on an upper border and/or a lower border of the display of the image acquisition device.

In some embodiments, the M second cameras are arranged at a middle position of an upper border and/or a lower border of the image acquisition device.

In some embodiments, the N first cameras include at least one of color cameras or depth cameras.

In some embodiments, the M second cameras are depth cameras, and the M second cameras include at least one of time-of-flight cameras, binocular stereo cameras or structured light stereo cameras.

In yet another aspect, an electronic device is provided, which includes an image processing device and the image acquisition device described in any of the above embodiments. The image processing device is configured to process image information acquired by the image acquisition device.

In yet another aspect, a non-transitory computer-readable storage medium is provided. The non-transitory computer-readable storage medium has stored computer program instructions that, when run on a computer (for example, an electronic device), cause the computer to perform the image acquisition method as described in any of the above embodiments.

In yet another aspect, a computer program product is provided. The computer program product includes computer program instructions stored on a non-transitory computer-readable storage medium. When the computer program instructions are executed on a computer (for example, an electronic device), the computer program instructions cause the computer to perform the image acquisition method as described in any of the above embodiments.

BRIEF DESCRIPTION OF THE DRAWINGS

In order to describe technical solutions in the present disclosure more clearly, the accompanying drawings to be used in some embodiments of the present disclosure will be introduced briefly. However, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1:
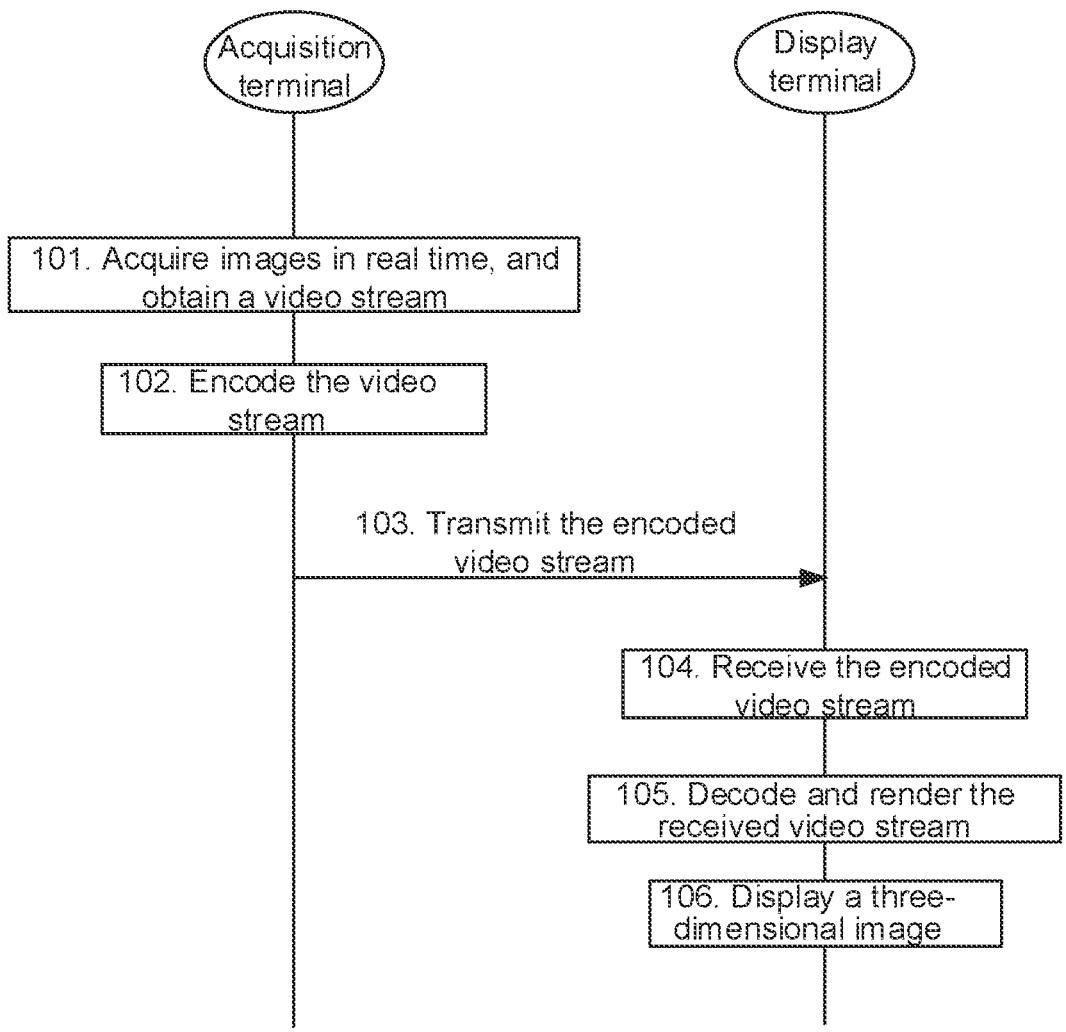
FIG. 1 is a flow diagram showing a communication between an acquisition terminal and a display terminal, in accordance with some embodiments.

The technical solutions in some embodiments of the present disclosure will be described clearly and completely with reference to the accompanying drawings. However, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to". In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, terms such as "first" and "second" are only used for descriptive purposes, and are not to be construed as indicating or implying the relative importance or implicitly indicating the number of indicated technical features. Thus, features defined with "first" and "second" may explicitly or implicitly include one or more of the features. In the description of the embodiments of the present disclosure, the term "multiple", "a plurality of" or "the plurality of" means two or more unless otherwise specified.

In the description of some embodiments, the terms "coupled" and "connected" and derivatives thereof may be used. For example, the term "connected" may be used in the description of some embodiments to indicate that two or more components are in direct physical or electrical contact with each other. As another example, the term "connected" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the context herein.

The phrase "at least one of A, B and C" has the same meaning as the phrase "at least one of A, B or C", both including following combinations of A, B and C: only A, only B, only C, a combination of A and B, a combination of A and C, a combination of B and C, and a combination of A, B and C.

The phrase "A and/or B" includes following three combinations: only A, only B, and a combination of A and B.

As used herein, the term "if" is, optionally, construed to mean "when" or "in a case where" or "in response to determining" or "in response to detecting", depending on the context. Similarly, the phrase "if it is determined" or "if [a stated condition or event] is detected" is, optionally, construed to mean "in a case where it is determined" or "in response to determining" or "in a case where [the stated condition or event] is detected" or "in response to detecting [the stated condition or event]", depending on the context.

The use of "applicable to" or "configured to" herein means an open and inclusive expression, which does not exclude devices that are applicable to or configured to perform additional tasks or steps.

In addition, the phase "based on" used is meant to be open and inclusive, since a process, step, calculation or other action that is "based on" one or more of the stated conditions or values may, in practice, be based on additional conditions or value exceeding those stated.

As used herein, the term such as "about", "substantially" or "approximately" includes a stated value and an average value within an acceptable range of deviation of a particular value, and the acceptable range of deviation is determined by a person of ordinary skill in the art in view of the measurement in question and errors associated with measurement of a particular quantity (i.e., the limitation of the measurement system).

Exemplary embodiments are described herein with reference to segmental views and/or plan views as idealized exemplary drawings. In the accompanying drawings, thicknesses of layers and sizes of regions are enlarged for clarity. Thus, variations in shape relative to the accompanying drawings due to, for example, manufacturing technologies and/or tolerances may be envisaged. Therefore, the exemplary embodiments should not be construed as being limited to the shapes of the areas shown herein, but including shape deviations due to, for example, manufacturing. For example, an etched region shown in a rectangular shape generally has a feature of being curved. Therefore, the regions shown in the accompanying drawings are schematic in nature, and their shapes are not intended to show actual shapes of the regions in an apparatus, and are not intended to limit the scope of the exemplary embodiments.

Generally, compared with traditional video communication, optical field video communication may record higher-dimensional light data, so that isolation caused by interaction of the traditional video communication can be eliminated, and users can feel each other's faces and voices more realistically. Moreover, the optical field video communication helps enterprises to realize a mixed online and offline work form, so that the work is no longer limited in space.

In an optical field video communication scenario, two or more electronic devices may communicate by acquiring optical field video information. Each electronic device may be used as an acquisition terminal, and may also be used as a display terminal. For example, when the first electronic device is in video communication with the second electronic device, the first electronic device may be used as an acquisition terminal to acquire images, and the second electronic device may be used as a display terminal to display the images acquired by the first electronic device. For another example, when the first electronic device is in video communication with the second electronic device, the second electronic device may be used as an acquisition terminal to acquire images, and the first electronic device may be used as a display terminal to display the images acquired by the second electronic device. It can be understood that, when the first electronic device is in video communication with the second electronic device, the first electronic device may be used as an acquisition terminal or a display terminal, and the second electronic device may be used as an acquisition terminal or a display terminal. Moreover, when the first electronic device is used as an acquisition terminal, the second electronic device is used as a display terminal; and when the first electronic device is used as a display terminal, the second electronic device is used as an acquisition terminal.

In some embodiments, as shown in FIG. 1, during the optical field video chat, the communication between the acquisition terminal and the display terminal includes the following steps.

In step 101, the acquisition terminal acquires real-time images and obtains a video stream. The acquisition terminal adopts a plurality of cameras (e.g., a red green blue (RGB) camera group) for real-time image acquisition to acquire images of the acquisition terminal in real time.

In step 102, the acquisition terminal encodes the video stream.

In step 103, the acquisition terminal transmits the encoded video stream to the display terminal. For example, the acquisition terminal transmits the encoded video stream to the display terminal through a network.

In step 104, the display terminal receives the encoded video stream.

In step 105, the display terminal decodes and renders the received video stream.

In step 106, the display terminal displays a three-dimensional (3D) image.

However, due to a large amount of optical field video information, real-time acquisition, video encoding, network transmission, and video decoding and rendering consume huge computing resources and transmission bandwidth. Moreover, a viewer of the display terminal is generally a single user. Due to the limitation of the pupil size of the user, the number of viewpoints that can enter eyes of the user on the display terminal at the same time is very limited, and a large number of views cannot enter the eyes. Therefore, in the optical field video chat, if the plurality of cameras for real-time image acquisition in the acquisition terminal all perform the acquisition, it will cause a great waste of computing resources and transmission bandwidth.

In light of this, some embodiments of the present disclosure provide an image acquisition method. The acquisition terminal selects a part of cameras from the plurality of cameras at the acquisition terminal for image acquisition according to position information of the eyes of the viewer of the display terminal, and another part of cameras does not participate in the acquisition, which can reduce the waste of computer computing power and transmission bandwidth resources. Moreover, in the video communication scenario, the number of viewpoints entering the eyes of the viewer of the display terminal is very limited; therefore, the images acquired by the part of cameras, which is selected according to the position information of the eyes of the viewer, in the acquisition terminal can meet the requirements of the viewer of the display terminal.

Figure 2:
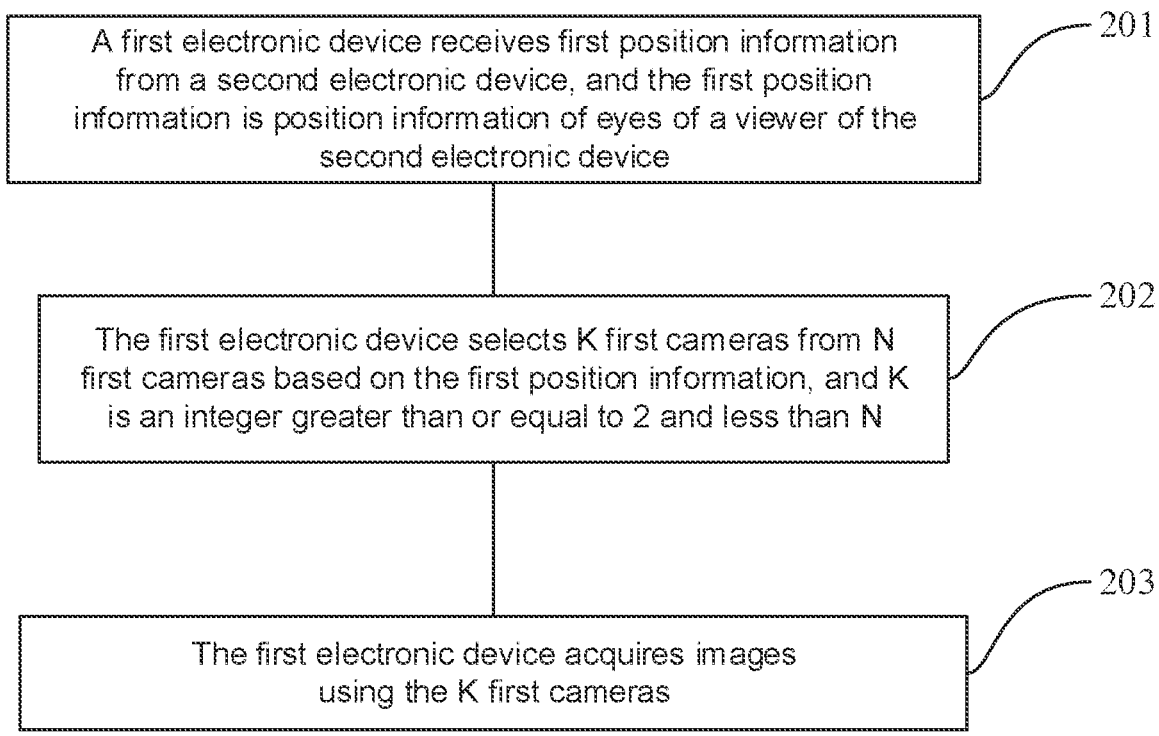
FIG. 2 is a flow diagram of an image acquisition method, in accordance with some embodiments.

Some embodiments of the present disclosure provide an image acquisition method, the image acquisition method is applied to the first electronic device, and the first electronic device includes N first cameras, N being an integer greater than or equal to 3. As shown in FIG. 2, the image acquisition method includes the following steps.

In step 201, the first electronic device receives first position information from the second electronic device, and the first position information is position information of eyes of a viewer of the second electronic device.

For example, in steps 201 to 203, when the first electronic device is in video communication with the second electronic device, the first electronic device is used as the acquisition terminal, the second electronic device is used as the display terminal, and images viewed by the viewer of the second electronic device are the images acquired by the first electronic device. In the video communication scenario, the number of viewpoints entering the eyes of the viewer of the second electronic device is very limited; therefore, the first electronic device obtains the position information of the eyes of the viewer of the second electronic device, the acquisition terminal may obtain the position of the eyes of the viewer of the display terminal, and part of cameras in the acquisition terminal may be selected for image acquisition according to the position of the eyes of the viewer of the display terminal.

In some embodiments, the first position information may be 3D position information acquired by a depth camera in the second electronic device, or may be two-dimensional (2D) position information obtained from the 3D position information acquired by the depth camera in the second electronic device. The depth camera may be an RGB-D camera. For example, the depth camera may be a time-of-flight camera, a binocular stereo camera, or a structured light stereo camera.

In some embodiments, the first position information may include at least one of position information of a left eye of the viewer of the second electronic device or position information of a right eye of the viewer of the second electronic device. The first position information may also be position information determined according to the position information of the left eye of the viewer of the second electronic device and the position information of the right eye of the viewer of the second electronic device. For example, the first position information may be information of a middle position between the left eye and the right eye of the viewer of the second electronic device. In the following embodiments are described by taking an example in which the first position information includes first left eye position information and first right eye position information, the first left eye position information is the position information of the left eye of the viewer of the second electronic device, and the first right eye position information is the position information of the right eye of the viewer of the second electronic device.

In step 202, the first electronic device selects K first cameras from N first cameras based on the first position information, K being an integer greater than or equal to 2 and less than N.

The first cameras are at least one of a color camera or a depth camera. The color camera may include an RGB camera. The depth camera may include an RGB-D camera.

In some embodiments, the N first cameras are arranged on an upper border and/or a lower border of the first electronic device.

In some embodiments, distances between the N first cameras in the first electronic device may be the same or different. For example, a distance between first cameras located at the middle of the upper border and/or the lower border of the first electronic device may be smaller than a distance between first cameras located at an edge of the first electronic device, so that a higher-quality viewpoint view may be provided at the middle position. FIGS. 3B, 4 to 6, and 10 to 14 in the following embodiments each illustrate an example in which the distances between the first cameras arranged on the upper border and/or the lower border of the first electronic device are the same.

In some embodiments, the above step 202 includes: based on a projected position of second position information on the upper border and/or the lower border of the first electronic device, selecting, by the first electronic device, the K first cameras closest to the projected position from the N first cameras. The second position information is a corresponding position of the first position information on a display of the first electronic device.

In some embodiments, the first position information may be the 3D position information acquired by the depth camera in the second electronic device. The first position information is projected on a display of the second electronic device to obtain 2D position information, on a plane where the display of the second electronic device is located, of the eyes of the viewer of the second electronic device, and then the 2D position information is mirrored to the display of the first electronic device to obtain the second position information. That is to say, the second position information is position information after mirroring 2D coordinates of the first position information projected on a display of the display terminal to a display of the acquisition terminal. The embodiments of the present disclosure do not limit the method of obtaining the second position information through the first position information. For example, the first position information may be the 2D position information obtained according to the 3D position information acquired by the depth camera in the second electronic device, and the first position information may be mirrored to the display of the first electronic device to obtain the second position information.

In some embodiments, considering an example in which the first position information includes the first left eye position information and the first right eye position information, since the second position information is a corresponding position of the first position information on the display of the first electronic device, the second position information includes second left eye position information and second right eye position information. The second left eye position information is position information after mirroring 2D coordinates of the first left eye position information projected on the display of the display terminal to the display of the acquisition terminal. The second right eye position information is position information after mirroring 2D coordinates of the first right eye position information projected on the display of the display terminal to the display of the acquisition terminal.

For example, the above step 202 includes: based on a projected position of the second left eye position information on the upper border and/or the lower border of the first electronic device, selecting, by the first electronic device, K1 first cameras closest to the projected position from the N first cameras; and based on a projected position of the second right eye position information on the upper border and/or the lower border of the first electronic device, selecting, by the first electronic device, K2 first cameras closest to the projected position from the N first cameras. A sum of K1 and K2 is greater than or equal to K. The embodiments of the present disclosure do not limit the specific values of K1, K2 and K. K may be any value less than N, K1 may be a value less than or equal to K, and K2 may also be a value less than or equal to K.

In some embodiments, K1 and K2 may be the same or different. The following embodiments are described by taking an example in which K1 and K2 are the same. It can be understood that, according to the second left eye position information and the second right eye position information, the first electronic device selects K1 cameras closest to the projected position of the second left eye position information on the upper border and/or the lower border of the first electronic device and K1 cameras closest to the projected position of the second right eye position information on the upper border and/or the lower border of the first electronic device respectively; and at most 2×K1 first cameras may be selected. If there are same camera(s) in K1 cameras closest to the projected position of the second left eye position information on the upper border and/or the lower border of the first electronic device and K1 cameras closest to the projected position of the second right eye position information on the upper border and/or the lower border of the first electronic device that are selected respectively according to the second left eye position information and the second right eye position information, then the number K of first cameras that are finally selected is less than 2×K1.

The first cameras are RGB cameras, and according to N RGB cameras that are arranged on different positions of the frame of the first electronic device, different implementations of selecting K RGB cameras from the N RGB cameras will be described below.

Figure 3A:
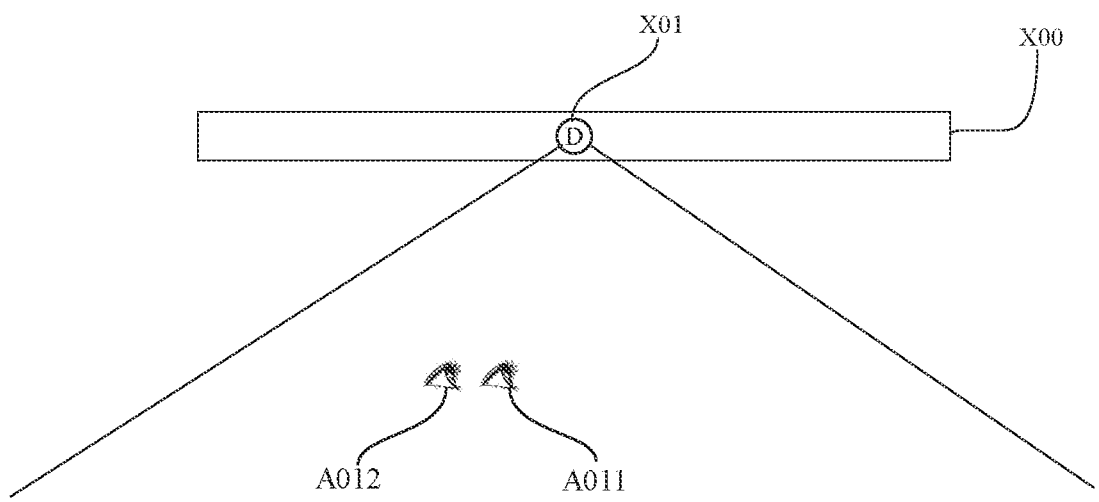
FIG. 3A is a schematic diagram showing first position information, in accordance with some embodiments.
Figure 3B:
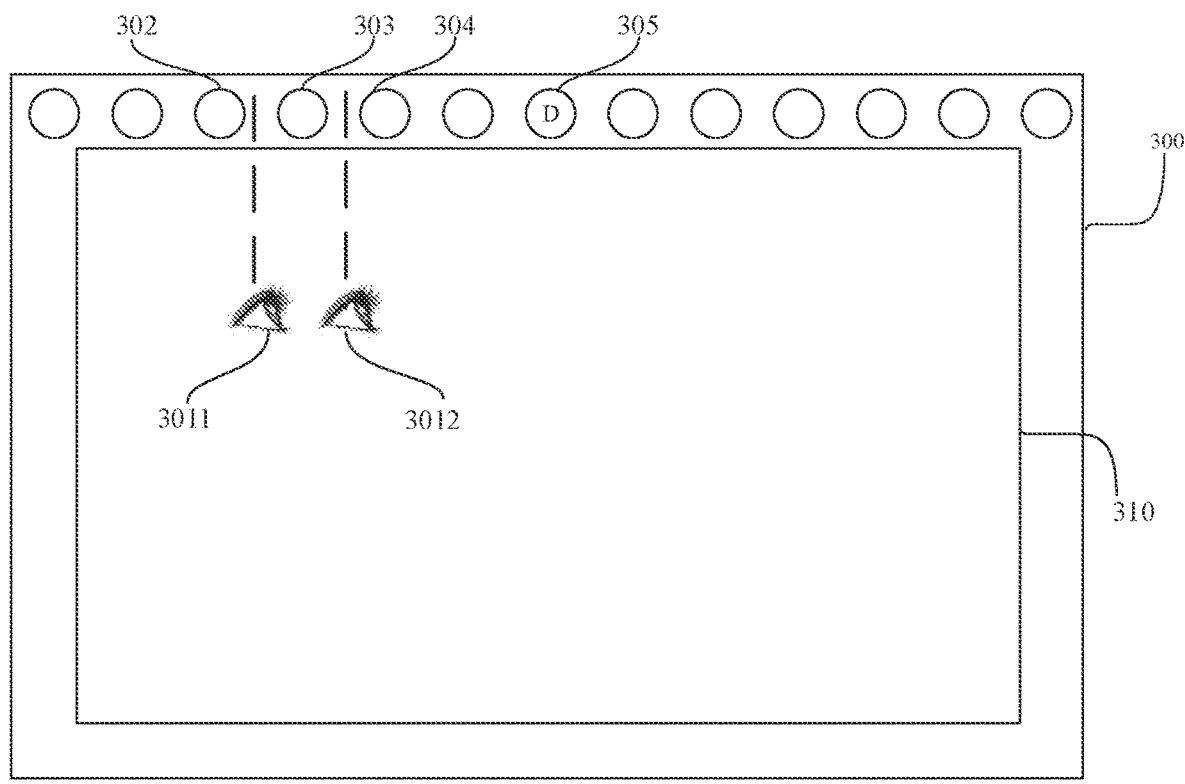
FIG. 3B is a structural diagram of a first electronic device, in accordance with some embodiments.
Figure 3C:
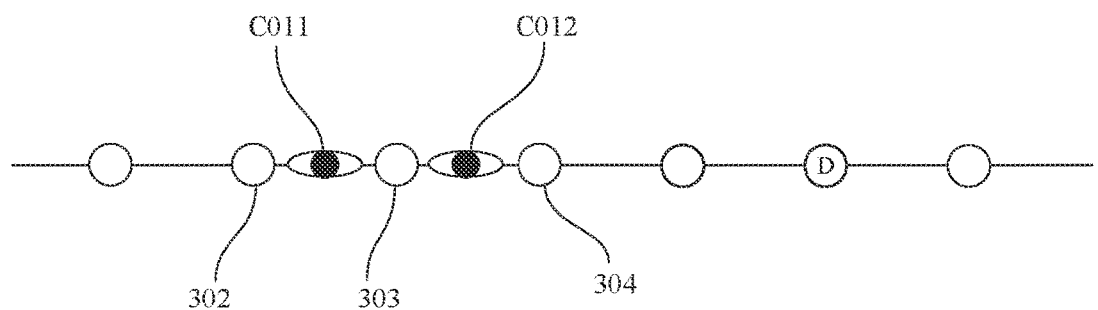
FIG. 3C is a schematic diagram showing projection position information of second position information on an upper border of a first electronic device, in accordance with some embodiments.

For example, as shown in FIGS. 3A to 3C, considering an example in which the first electronic device 300 is used as the acquisition terminal and the second electronic device X00 is used as the display terminal, the relationship between the first position information, the second position information, and the projected position of the second position information on the upper border of the first electronic device is described. As shown in FIG. 3A, the second electronic device X00 acquires the position information of the eyes of the viewer of the display terminal using the RGB-D camera X01, so as to obtain the first left eye position information A012 and the first right eye position information A011. As shown in FIG. 3B, the first electronic device 300 obtains the second left eye position information 3012 and the second right eye position information 3011 according to mirrored positions of the first left eye position information A012 and the first right eye position information A011 on the display 310 of the first electronic device 300. As shown in FIG. 3C, the projected position of the second right eye position information 3011 on the upper border of the first electronic device 300 is second right eye projected position information C011, and the projected position of the second left eye position information 3012 on the upper border of the first electronic device 300 is second left eye projected position information C012.

For example, as shown in FIGS. 3B and 3C, considering an example in which the first electronic device includes 12 RGB cameras and the 12 RGB cameras are arranged on the upper border of the first electronic device 300, based on the projected position of the second position information on the upper border of the first electronic device 300, how to select K first cameras closest to the projected position from the 12 first cameras will be described. The first electronic device 300 may select an RGB camera 302 and an RGB camera 303 that are closest to the projected position of the second right eye position information 3011 on the upper border of the first electronic device 300, i.e., closest to the second right eye projected position information C011, from the 12 RGB cameras according to the second right eye position information 3011. The first electronic device 300 may select the RGB camera 303 and an RGB camera 304 that are closest to the projected position of the second left eye position information 3012 on the upper border of the first electronic device 300, i.e., closest to the second left eye projected position information C012, from the 12 RGB cameras according to the second left eye position information 3012. Since the RGB cameras selected based on the second right-eye position information 3011 and the RGB cameras selected based on the second left-eye position information 3012 both include the RGB camera 303, it can be considered that, based on the projected position of the second position information on the upper border of the first electronic device 300, the first electronic device may select 3 first cameras closest to the projected position from the 12 RGB cameras, and the 3 first cameras are the RGB camera 302, the RGB camera 303 and the RGB camera 304.

For example, the relationship between the first position information, the second position information, and the projected position of the second position information on the lower border of the first electronic device is similar to the relationship between the first position information, the second position information, and the projected position of the second position information on the upper border of the first electronic device, which will not be repeated in the following embodiments of the present disclosure.

Figure 4:
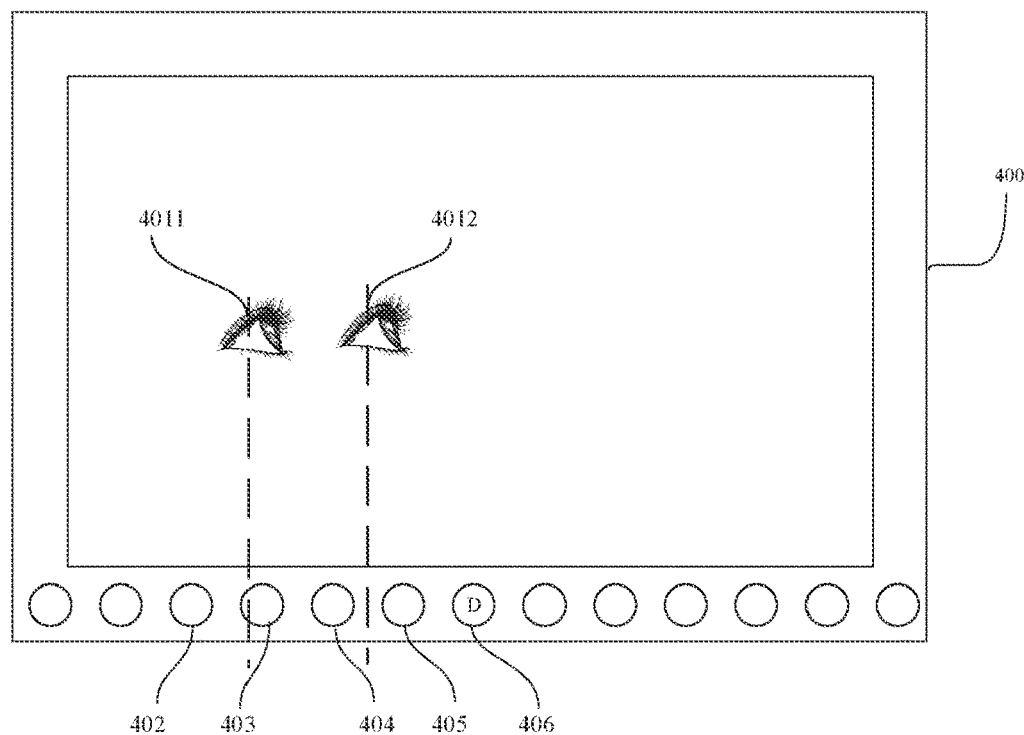
FIG. 4 is a structural diagram of a first electronic device, in accordance with some embodiments.

For example, as shown in FIG. 4, the first electronic device includes 12 RGB cameras, and the 12 RGB cameras are arranged on the lower border of the first electronic device 400. The first electronic device may select an RGB camera 402 and an RGB camera 403 that are closest to the projected position of the second right eye position information 4011 on the lower border of the first electronic device 400 from the 12 RGB cameras according to the second right eye position information 4011. The first electronic device may select an RGB camera 404 and an RGB camera 405 that are closest to the projected position of the second left eye position information 4012 on the lower border of the first electronic device 400 from the 12 RGB cameras according to the second left eye position information 4012. That is, based on the projected position of the second position information on the lower border of the first electronic device 400, the first electronic device may select 4 first cameras closest to the projected position from the 12 RGB cameras, and the 4 first cameras are the RGB camera 402, the RGB camera 403, the RGB camera 404 and the RGB camera 405.

Figure 5:
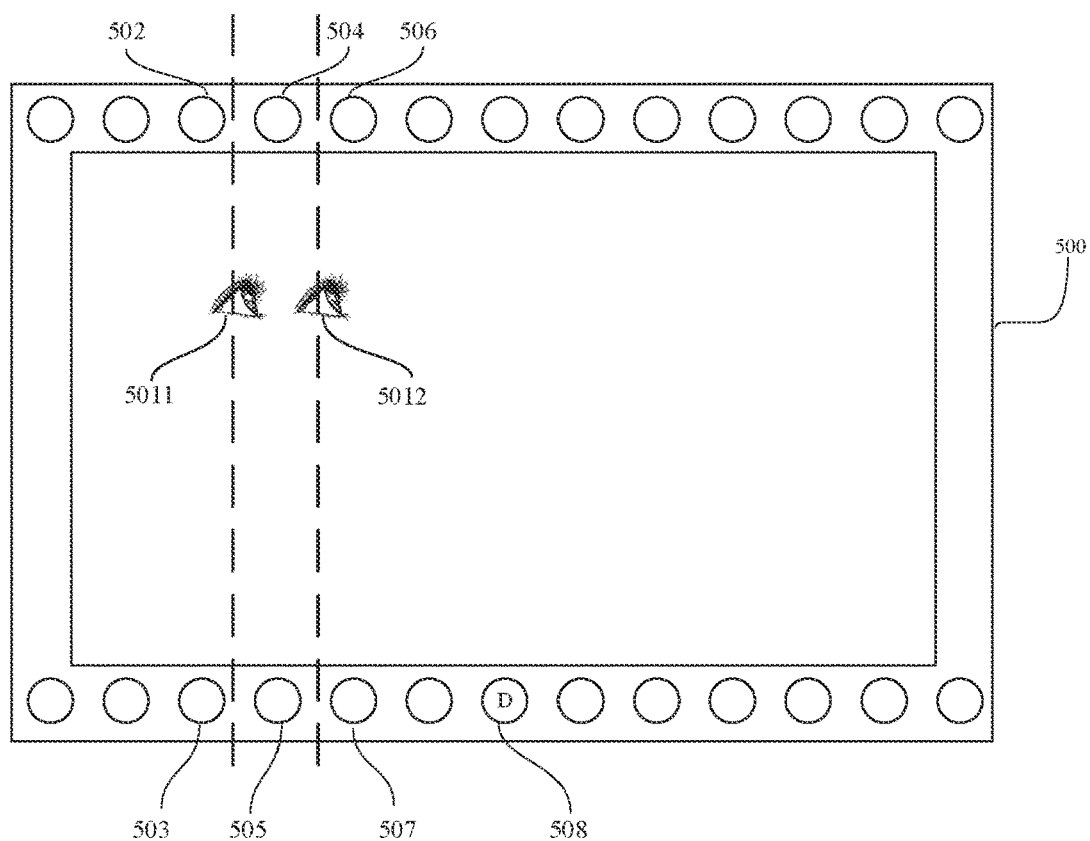
FIG. 5 is a structural diagram of another first electronic device, in accordance with some embodiments.

For example, as shown in FIG. 5, the first electronic device includes 25 RGB cameras, 13 RGB cameras are arranged on the upper border of the first electronic device 500, and the remaining 12 RGB cameras are arranged on the lower border of the first electronic device 500.

As shown in FIG. 5, according to the second right eye position information 5011, the first electronic device 500 may select an RGB camera 502 and an RGB camera 504 that are closest to the projected position of the second right eye position information 5011 on the upper border of the first electronic device 500 from the 13 RGB cameras on the upper border, and select an RGB camera 503 and an RGB camera 505 that are closest to the projected position of the second right eye position information 5011 on the lower border of the first electronic device 500 from the 12 RGB cameras on the lower border. According to the second left eye position information 5012, the first electronic device 500 may select the RGB camera 504 and an RGB camera 506 that are closest to the projected position of the second left eye position information 5012 on the upper border of the first electronic device 500 from the 13 RGB cameras on the upper border, and select the RGB camera 505 and an RGB camera 507 that are closest to the projected position of the second left eye position information 5012 on the lower border of the first electronic device 500 from the 12 RGB cameras on the lower border. That is, based on the projected positions of the second position information on the upper border and the lower border of the first electronic device 500, the first electronic device may select 6 first cameras closest to the projected positions from the 25 RGB cameras, and the 6 first cameras are the RGB camera 502, the RGB camera 503, the RGB camera 504, the RGB camera 505, the RGB camera 506 and the RGB camera 507.

Figure 6:
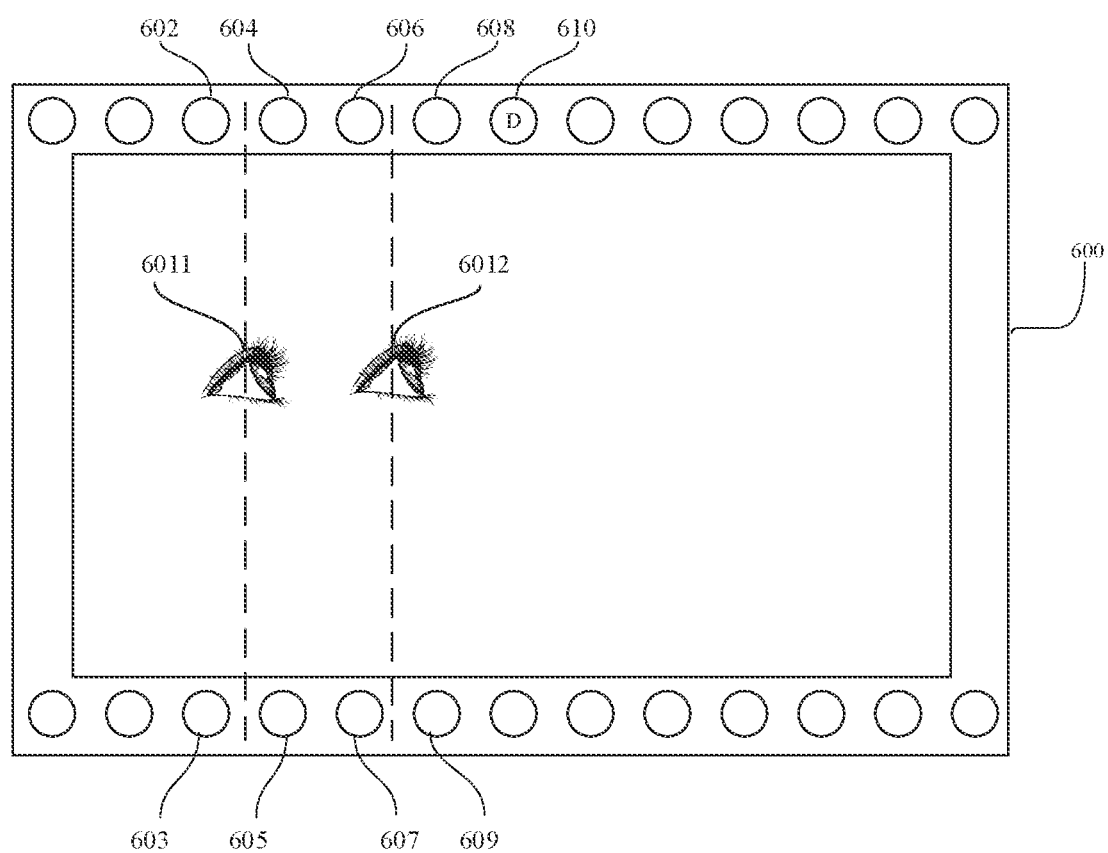
FIG. 6 is a structural diagram of yet another first electronic device, in accordance with some embodiments.

For example, as shown in FIG. 6, the first electronic device includes 25 RGB cameras, 12 RGB cameras are arranged on the upper border of the first electronic device 600, and the remaining 13 RGB cameras are arranged on the lower border of the first electronic device 600.

As shown in FIG. 6, according to the second right eye position information 6011, the first electronic device 600 may select an RGB camera 602 and an RGB camera 604 that are closest to the projected position of the second right eye position information 6011 on the upper border of the first electronic device 600 from the 12 RGB cameras on the upper border, and select an RGB camera 603 and an RGB camera 605 that are closest to the projected position of the second right eye position information 6011 on the lower border of the first electronic device 600 from the 13 RGB cameras on the lower border. According to the second left eye position information 6012, the first electronic device 600 may select an RGB camera 606 and an RGB camera 608 that are closest to the projected position of the second left eye position information 6012 on the upper border of the first electronic device 600 from the 12 RGB cameras on the upper border, and select an RGB camera 607 and an RGB camera 609 that are closest to the projected position of the second left eye position information 6012 on the lower border of the first electronic device 600 from the 13 RGB cameras on the lower border. That is, based on the projected positions of the second position information on the upper border and the lower border of the first electronic device 600, the first electronic device 600 may select 8 first cameras closest to the projected positions from the 25 RGB cameras, and the 8 first cameras are the RGB camera 602, the RGB camera 603, the RGB camera 604, the RGB camera 605, the RGB camera 606, the RGB camera 607, the RGB camera 608 and the RGB camera 609.

In some embodiments, the display of the first electronic device is divided into J triangular regions by the N first cameras, J is an integer greater than or equal to N; and when the second position information is located in a first region in the J triangular regions, the K first cameras are first cameras located at three vertices of the smallest triangular region that includes the first region.

In some embodiments, the first position information may be position information of the left eye of the viewer of the display terminal, position information of the right eye of the viewer of the display terminal, position information of the left and right eyes of the viewer of the display terminal, or information of the middle position between the left and right eyes of the viewer of the display terminal. Correspondingly, the second position information may be a corresponding position, on the display of the acquisition terminal, of the position information of the left eye of the viewer of the display terminal, a corresponding position, on the display of the acquisition terminal, of the position information of the right eye of the viewer of the display terminal, a corresponding position, on the display of the acquisition terminal, of the position information of the left and right eyes of the viewer of the display terminal, or a corresponding position, on the display of the acquisition terminal, of the information of the middle position between the left and right eyes of the viewer of the display terminal. That is to say, the second position information may be one piece of 2D position information, or two pieces of 2D position information. The following description is illustrate by taking an example in which the second position information is one piece of 2D position information.

In some embodiments, when the N first cameras are depth cameras, two depth cameras may be arranged closely at the middle position of the upper border, and the two depth cameras that are arranged closely are used as a first camera group to participate in the image acquisition of the first electronic device at the same time, so as to increase depth accuracy of a central viewpoint.

Considering an example in which the first cameras are RGB-D cameras, according to the second position information and difference in the number and positions of the N RGB-D cameras in the first electronic device, different implementations of selecting K RGB cameras from the N RGB cameras are described below.

Figure 7:
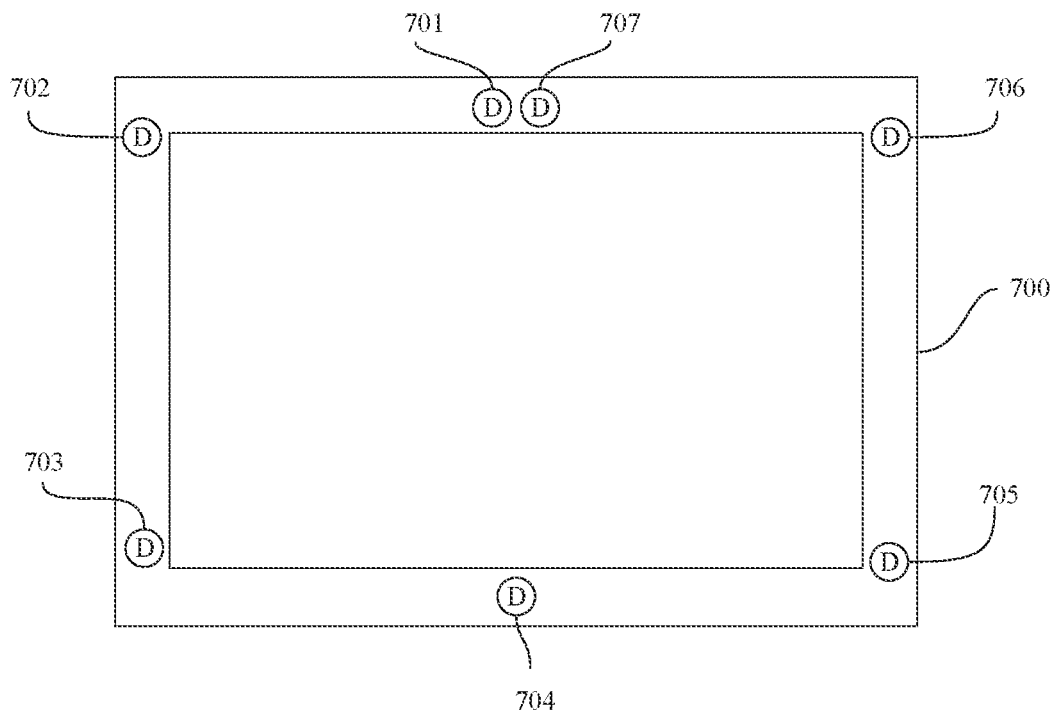
FIG. 7 is a structural diagram of yet another first electronic device, in accordance with some embodiments.
Figure 7:
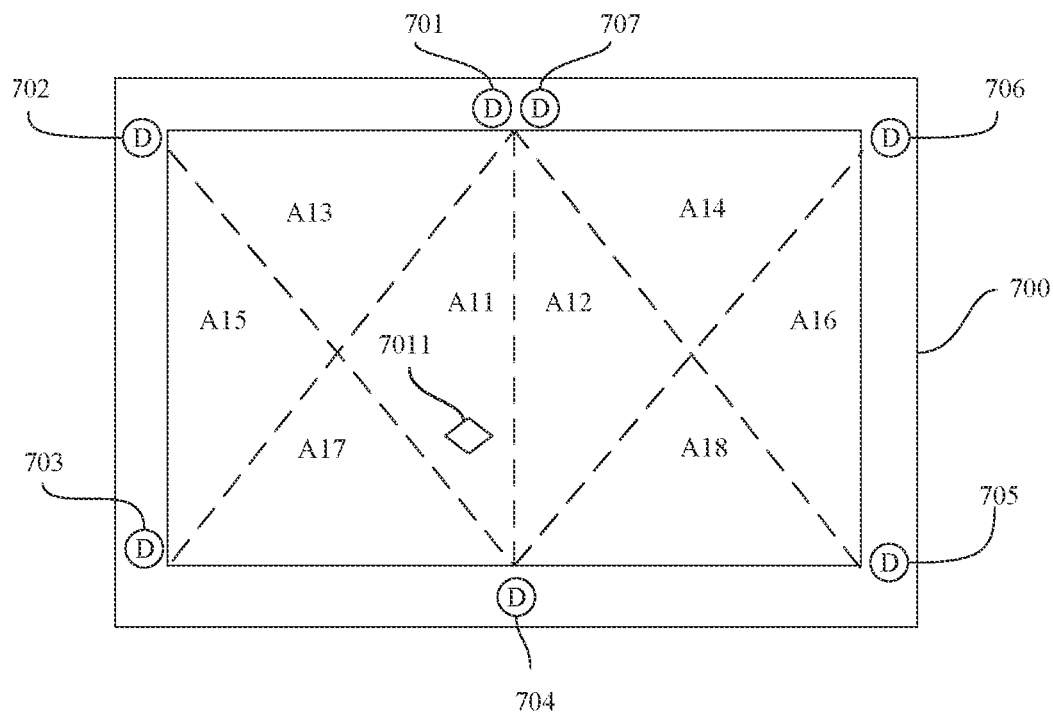

For example, as shown in (a) of FIG. 7, the first electronic device 700 includes 7 RGB-D cameras, which are RGB-D camera 701 to RGB-D camera 707, the RGB-D camera 701 and the RGB-D camera 707 are arranged at the middle position of the upper border of the first electronic device 700, and the RGB-D camera 702, the RGB-D camera 703, the RGB-D camera 705 and the RGB-D camera 706 are respectively arranged at four corners of a frame of the first electronic device 700, the RGB-D camera 704 is arranged at the middle position of the lower border of the first electronic device 700.

As shown in (b) of FIG. 7, for example, the display of the first electronic device 700 is divided into 8 triangular regions by the 7 RGB-D cameras, and the 8 triangular regions are A11 to A18. Since the second position information 7011 is located in the first region A11, the first electronic device 700 may select cameras located at the three vertices of the smallest triangle that includes the first region A11 from the 7 RGB-D cameras as an acquisition camera group according to the second position information 7011. That is, the K RGB-D cameras selected by the first electronic device 700 from the 7 RGB-D cameras may be the RGB-D camera 701, the RGB-D camera 702, the RGB-D camera 704 and the RGB-D camera 707. Alternatively, the K RGB-D cameras selected by the first electronic device from the 7 RGB-D cameras may be the RGB-D camera 701, the RGB-D camera 703, the RGB-D camera 704 and the RGB-D camera 707.

Figure 8:
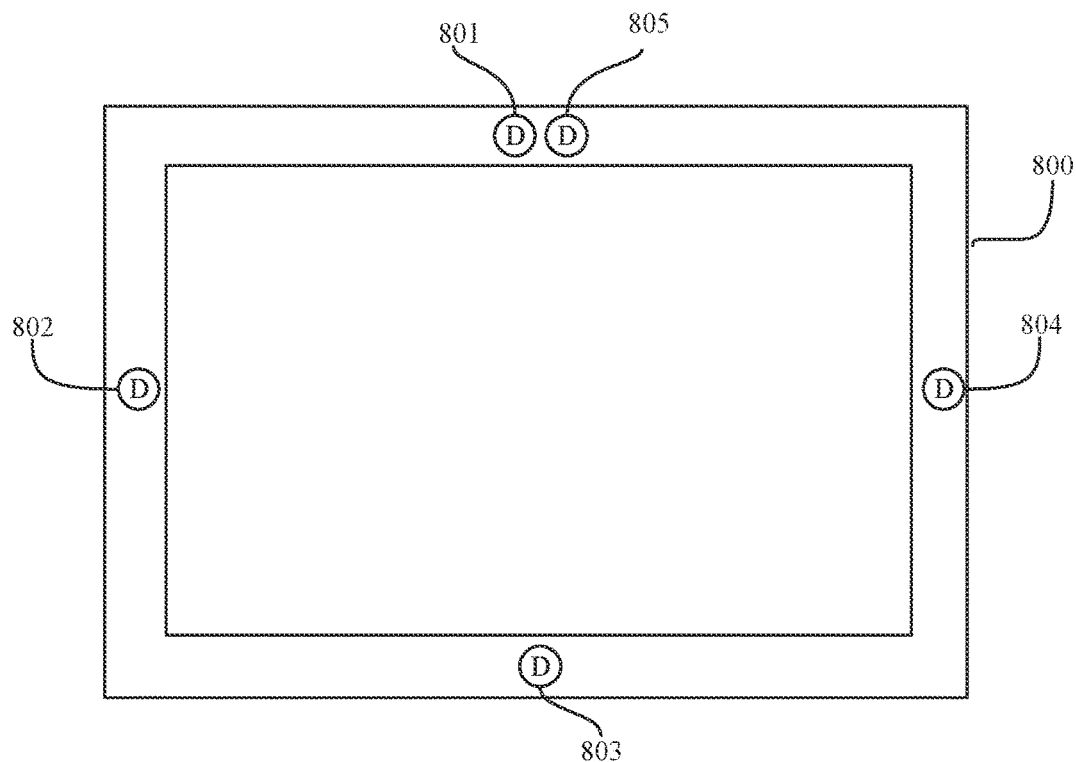
FIG. 8 is a structural diagram of yet another first electronic device, in accordance with some embodiments.
Figure 8:
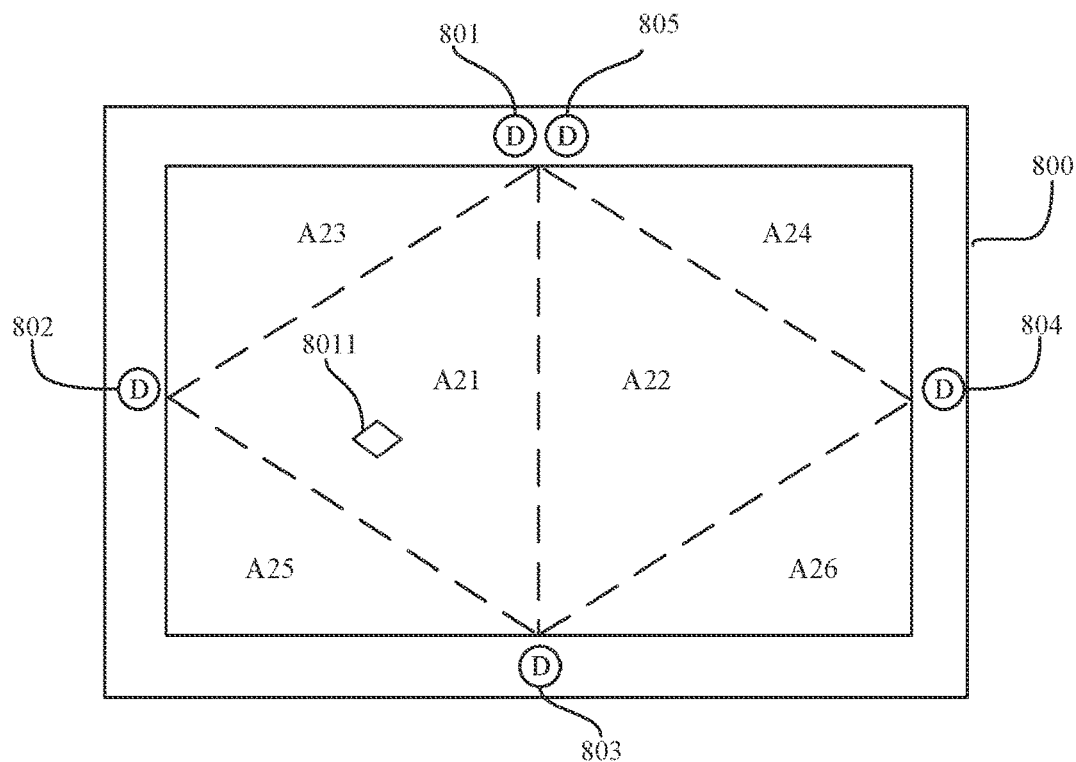

For example, as shown in (a) of FIG. 8, the first electronic device 800 includes 5 RGB-D cameras, which are RGB-D camera 801 to RGB-D camera 805, the RGB-D camera 801 and the RGB-D camera 805 are arranged at the middle position of the upper border of the first electronic device 800, the RGB-D camera 802 is arranged at the middle position of the left border of the first electronic device 800, and the RGB-D camera 803 is arranged at the middle position of the lower border of the first electronic device 800, and the RGB-D camera 804 is arranged at the middle position of the right border of the first electronic device 800. As shown in (b) of FIG. 8, for example, the display of the first electronic device 800 is divided into 6 triangular regions by the 5 RGB-D cameras, and the six triangular regions are A21 to A26. Since the second position information 8011 is located in the first region A21, the first electronic device 800 may select cameras located at the three vertices of the smallest triangle that includes the first region A21 from the 5 RGB-D cameras as an acquisition camera group according to the second position information 8011. That is, the K RGB-D cameras selected by the first electronic device 800 from the 5 RGB-D cameras may be the RGB-D camera 801, the RGB-D camera 802, the RGB-D camera 803 and the RGB-D camera 805. It can be understood that when the second position information is located in the first region A23, the K RGB-D cameras selected by the first electronic device 800 from the 5 RGB-D cameras may be the RGB-D camera 801, the RGB-D camera 802 and the RGB-D camera 805. Alternatively, in order to increase the accuracy of the images acquired by the first electronic device 800, the K RGB-D cameras selected by the first electronic device 800 from the 5 RGB-D cameras may be the RGB-D camera 801, the RGB-D camera 802, the RGB-D camera 803 and the RGB-D camera 805.

In step 203, the first electronic device acquires the images using the K first cameras.

The first electronic device uses the K first cameras to acquire the images, and the K first cameras are selected based on the position information of the eyes of the viewer of the second electronic device, so that the images acquired by the K first cameras can meet the viewing requirements of the viewer of the second electronic device. Moreover, since the value of K is less than N, not all of the N first cameras are involved in the real-time image acquisition of the first electronic device. N-K first cameras are not involved in the real-time image acquisition of the first electronic device. Thus, the waste of computer computing power and transmission bandwidth resources can be reduced.

In some embodiments, the N first cameras in the first electronic device may all participate in the acquisition of the acquisition terminal. However, the first electronic device only processes the images acquired by the K first cameras which are selected by the first electronic device, and do not process the images acquired by the remaining N-K cameras. In this way, the waste of computer computing power and transmission bandwidth resources can be reduced.

Figure 9:
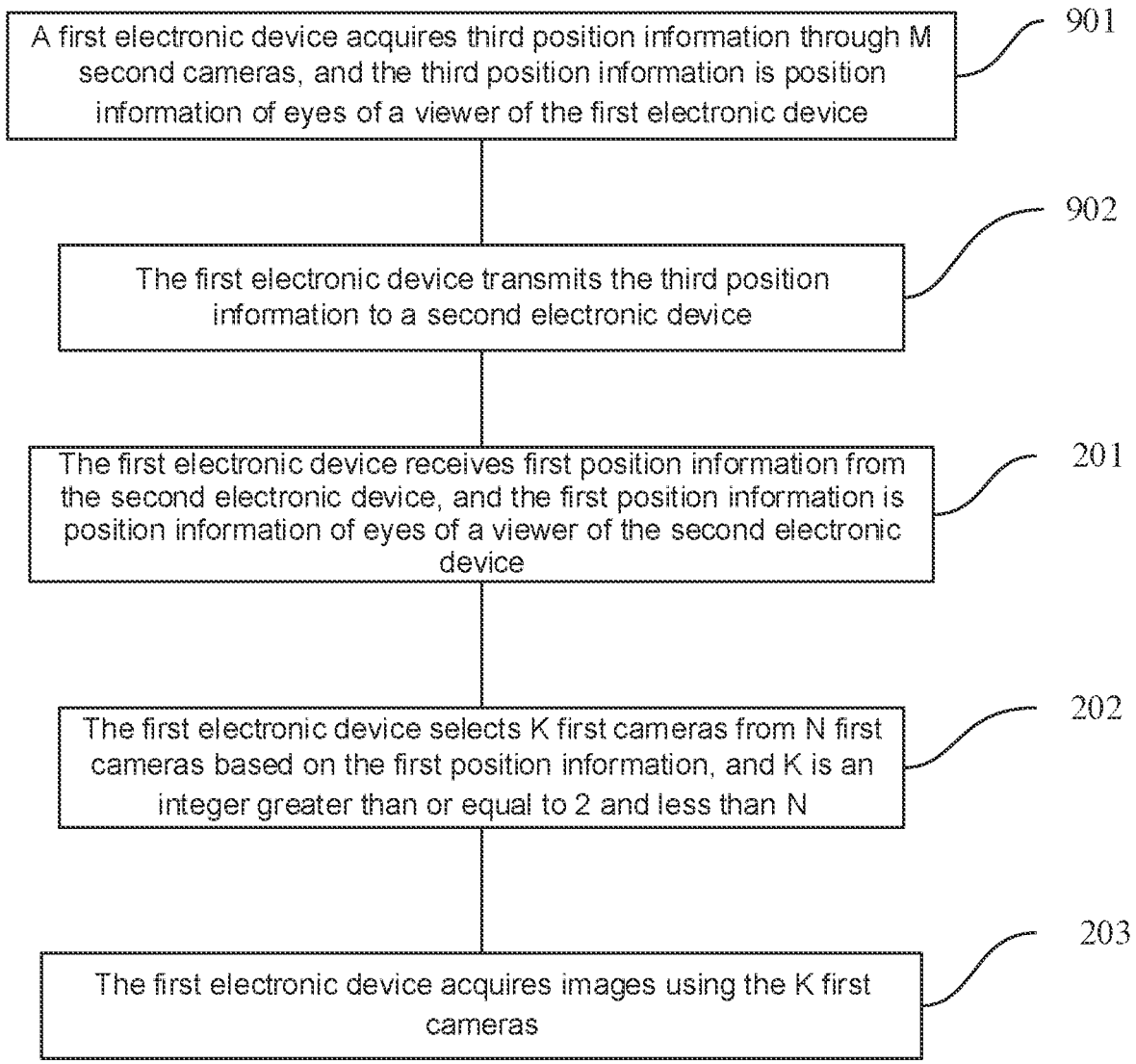
FIG. 9 is a flow diagram of another image acquisition method, in accordance with some embodiments.

In some embodiments, the first electronic device further includes M second cameras, and M is an integer greater than or equal to 1. As shown in FIG. 9, in addition to the above steps 201 to 203, the image acquisition method further includes the following steps.

In step 901, the first electronic device acquires third position information through the M second cameras, and the third position information is the position information of the eyes of the viewer of the first electronic device.

In some embodiments, in steps 901 to 902, when the first electronic device is in video communication with the second electronic device, the first electronic device is used as the display terminal, the second electronic device is used as the acquisition terminal, and the image viewed by the viewer of the first electronic device is the image acquired by the second electronic device.

In some embodiments, the second camera is a depth camera, and the M second cameras include at least one of time-of-flight cameras, binocular stereo cameras, or structured light stereo cameras. The embodiments of the present disclosure do not limit the type of the depth camera. The depth camera may detect a depth of field in a shooting space. Therefore, a distance between each point in the image and a camera of the depth camera can be accurately provided, together with position information of the point in the 2D image, 3D position information of each point in the image may be obtained. Thus, the first electronic device may directly obtain, through the M second cameras, the position information of the eyes of the viewer of the first electronic device, i.e., the third position information.

In some embodiments, the M second cameras are arranged at the middle position of the upper border and/or the lower border of the first electronic device. When the viewer views the display, the eyes of the viewer are generally located near the center of the screen. Therefore, by arranging the second camera(s) at the middle position of the upper border and/or lower border, it can ensure the accuracy of the third position information acquired by the second camera(s).

The number of the second cameras included in the first electronic device is not limited in the present disclosure. In some embodiments, the second camera and the first camera in the first electronic device may be the same camera, and the same camera may be used as the display terminal to acquire the position information of the eyes of the viewer of the display terminal, and may also be used as the acquisition terminal to acquire the images of the acquisition terminal in real time.

For example, as shown in (a) of FIG. 7, the first electronic device 700 includes one second camera, and the one second camera is the RGB-D camera 704. When the first electronic device 700 is used as the display terminal, the RGB-D camera 704 may obtain the third position information. When the first electronic device 700 is used as the acquisition terminal, the first electronic device 700 may select 4 RGB-D cameras from the 7 RGB-D cameras based on the second position information 7011. The 4 RGB-D cameras may be the RGB-D camera 701, the RGB-D camera 702, the RGB-D camera 704 and the RGB-D camera 707, and the RGB-D camera 702 may acquire the images of the first electronic device 700. That is to say, both the second camera(s) and the first cameras in the first electronic device 700 include the RGB-D camera 704, and the RGB-D camera 704 may acquire the position information of the eyes of the viewer of the display terminal when the first electronic device 700 is used as the display terminal, and may also acquire the images of the acquisition terminal in real time when the first electronic device 700 is used as the acquisition terminal.

The M RGB-D cameras arranged at different positions of the frame of the first electronic device will be described below by taking an example in which the second camera is the RGB-D camera.

For example, the first electronic device includes one RGB-D camera, and the one RGB-D camera is arranged at the middle position of the upper border of the first electronic device.

Figure 10:
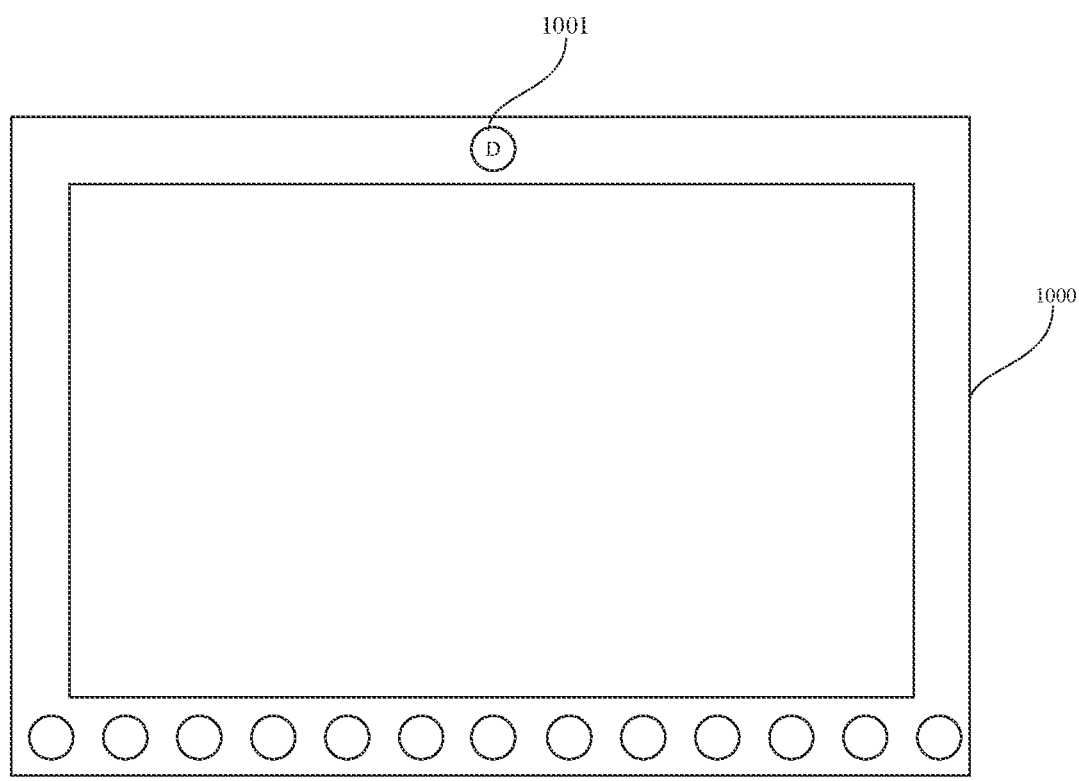
FIG. 10 is a structural diagram of yet another first electronic device, in accordance with some embodiments.

As shown in FIG. 3B, the first electronic device 300 includes one RGB-D camera 305, and the RGB-D camera 305 may be arranged at the middle position of the upper border of the first electronic device 300. As shown in FIG. 6, the first electronic device 600 includes one RGB-D camera 610, and the RGB-D camera 610 is arranged at the middle position of the upper border of the first electronic device 600. As shown in FIG. 10, the first electronic device 1000 includes one RGB-D camera 1001 arranged at the middle position of the upper border of the first electronic device 1000.

For example, the first electronic device includes one RGB-D camera, and the one RGB-D camera is arranged at the middle position of the lower border of the first electronic device.

Figure 11:
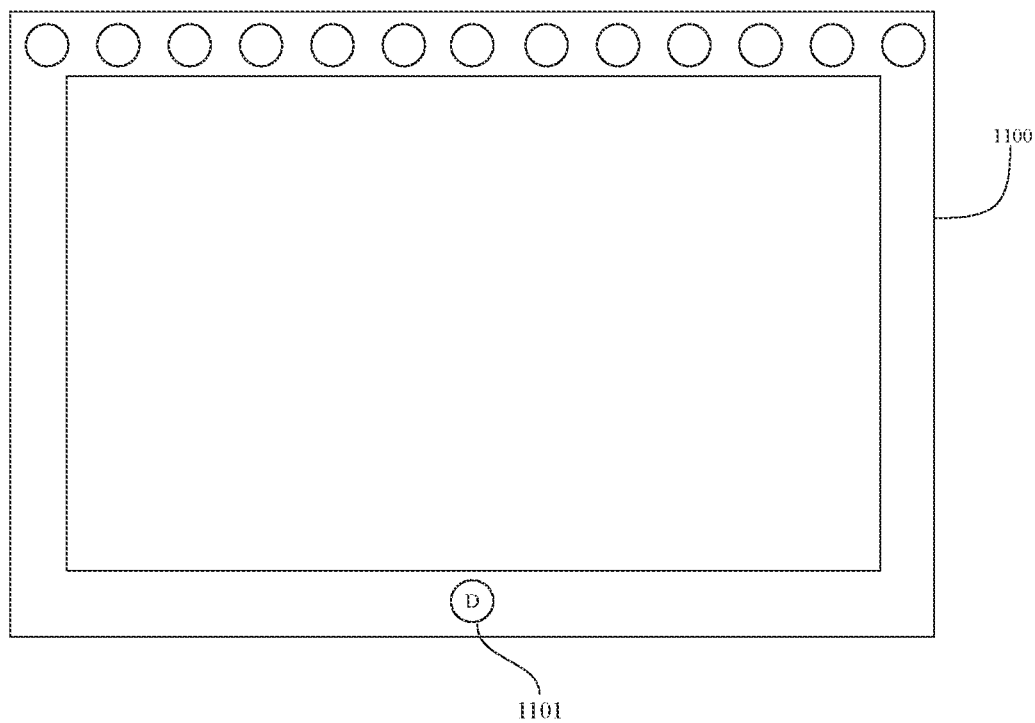
FIG. 11 is a structural diagram of yet another first electronic device, in accordance with some embodiments.

As shown in FIG. 4, the first electronic device 400 includes one RGB-D camera 406, and the RGB-D camera 406 is arranged at the middle position of the lower border of the first electronic device 400. As shown in FIG. 5, the first electronic device 500 includes one RGB-D camera 508, and the RGB-D camera 508 is arranged at the middle position of the lower border of the first electronic device 500. As shown in FIG. 11, the first electronic device 1100 includes one RGB-D camera 1101, and the RGB-D camera 1101 is arranged at the middle position of the lower border of the first electronic device 1100.

For example, the first electronic device includes two RGB-D cameras, and the two RGB-D cameras are respectively arranged at the middle positions of the upper border and the lower border of the first electronic device.

Figure 12:
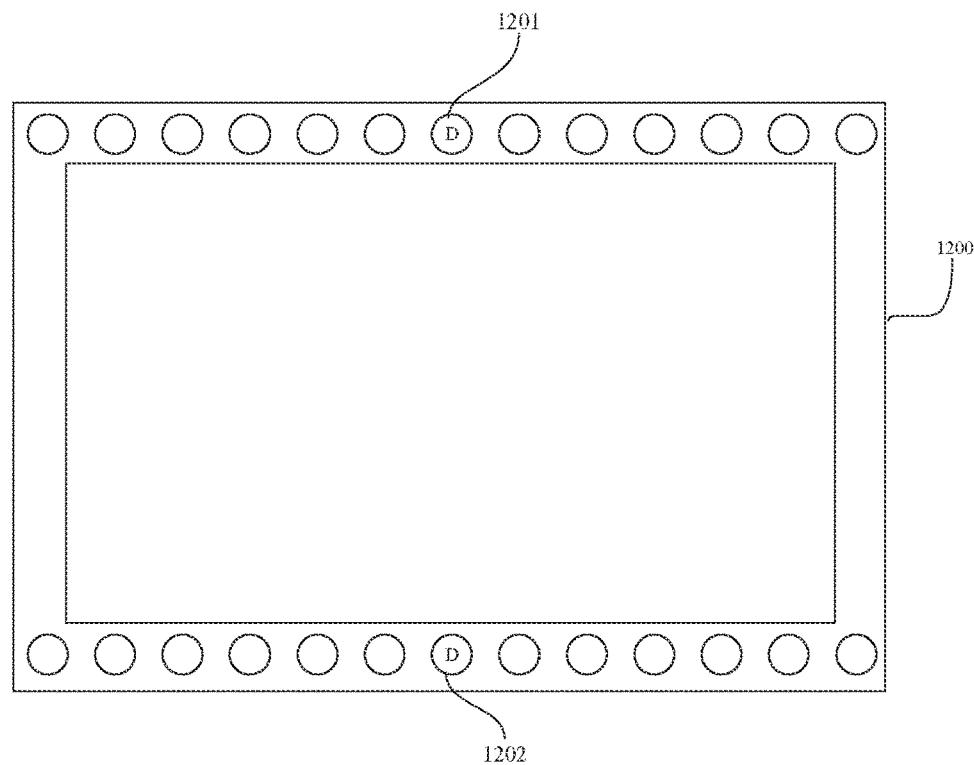
FIG. 12 is a structural diagram of yet another first electronic device, in accordance with some embodiments.
Figure 13:
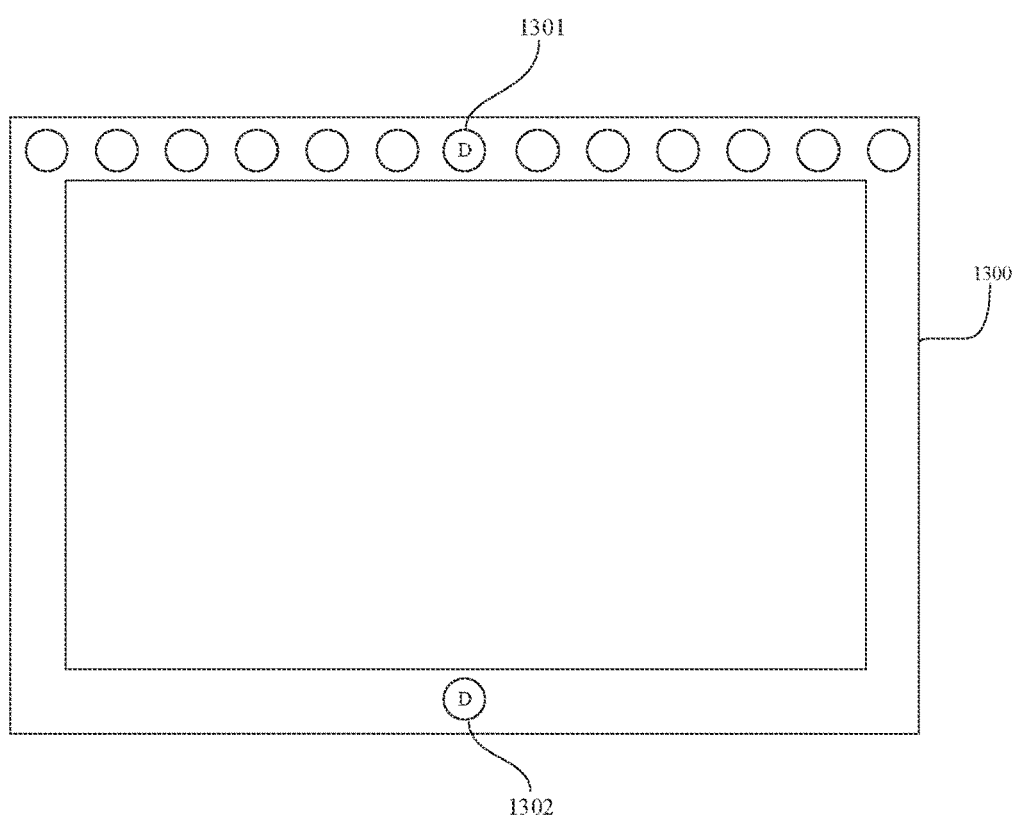
FIG. 13 is a structural diagram of yet another first electronic device, in accordance with some embodiments.
Figure 14:
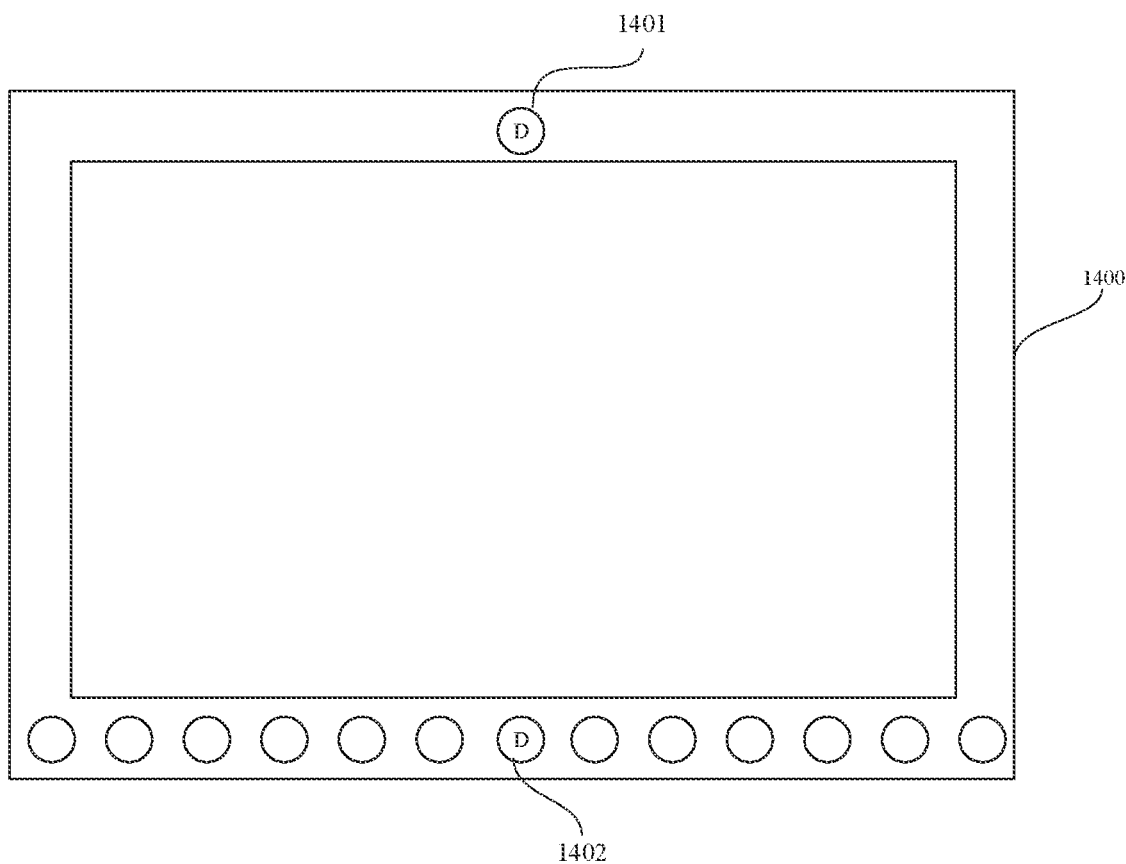
FIG. 14 is a structural diagram of yet another first electronic device, in accordance with some embodiments.

As shown in FIG. 12, the first electronic device 1200 includes two RGB-D cameras, which are the RGB-D camera 1201 and the RGB-D camera 1202, and the RGB-D camera 1201 and the RGB-D camera 1202 are respectively located at the middle positions of the upper border and the lower border of the first electronic device 1200. As shown in FIG. 13, the first electronic device 1300 includes two RGB-D cameras, which are the RGB-D camera 1301 and the RGB-D camera 1302, and the RGB-D camera 1301 and the RGB-D camera 1302 are respectively located at the middle positions of the upper border and the lower border of the first electronic device 1300. As shown in FIG. 14, the first electronic device 1400 includes two RGB-D cameras, which are the RGB-D camera 1401 and the RGB-D camera 1402, and the RGB-D camera 1401 and RGB-D camera 1402 are respectively located at the middle positions of the upper border and the lower border of the first electronic device 1400.

The relative positional relationship between the N first cameras and the M second cameras distributed in the first electronic device and the relationship between N and M are not limited in the present disclosure.

In some embodiments, when the N first cameras are arranged on the upper border and/or lower border of the first electronic device, the M second cameras may be arranged at the middle position of the upper border of the first electronic device, which will be exemplarily described below in conjunction with FIGS. 3B, 6 and 10.

For example, as shown in FIGS. 3B, 6 and 10, the M second cameras may be one RGB-D camera (for example, the RGB-D camera 305 in FIG. 3B, the RGB-D camera 610 in FIG. 6, and the RGB-D camera 1001 in FIG. 10), and the one RGB-D camera is arranged at the middle position of the upper border of the first electronic device. As shown in FIG. 3B, the N first cameras may be 12 RGB cameras, and the 12 RGB cameras may be arranged on the upper border of the first electronic device 300. Alternatively, as shown in FIG. 6, the N first cameras may be 25 RGB cameras, and the 25 RGB cameras may be arranged on the upper border and the lower border of the first electronic device 600. Alternatively, as shown in FIG. 10, the N first cameras may be 13 RGB cameras, and the 13 RGB cameras may be arranged on the lower border of the first electronic device 1000.

In some embodiments, when the N first cameras are arranged on the upper border and/or the lower border of the first electronic device, the M second cameras may be arranged at the middle position of the lower border of the first electronic device, which will be exemplarily described below in conjunction with FIGS. 4, 5 and 11.

For example, as shown in FIGS. 4, 5 and 11, the M second cameras may be one second camera (for example, the RGB-D camera 406 in FIG. 4, the RGB-D camera 508 in FIG. 5, and the RGB-D camera 1101 in FIG. 11), and the one RGB-D camera is arranged at the middle position of the lower border of the first electronic device. As shown in FIG. 4, the N first cameras may be 12 RGB cameras, and the 12 RGB cameras may be arranged on the lower border of the first electronic device 400. Alternatively, as shown in FIG. 5, the N first cameras may be 25 RGB cameras, and the 25 RGB cameras may be arranged on the upper border and the lower border of the first electronic device 500. Alternatively, as shown in FIG. 11, the N first cameras may be 13 RGB cameras, and the 13 RGB cameras may be arranged on the upper border of the first electronic device 1100.

In some embodiments, when the N first cameras are arranged on the upper border and/or the lower border of the first electronic device, the M second cameras may be arranged at the middle positions of the upper border and the lower border of the first electronic device, which will be exemplarily described below in conjunction with FIGS. 12 to 14.

For example, as shown in FIGS. 12 to 14, the M second cameras may be two RGB-D cameras (for example, the RGB-D camera 1201 and the RGB-D camera 1202 in FIG. 12, the RGB-D camera 1301 and the RGB-D camera 1302 in FIG. 13, and the RGB-D camera 1401 and the RGB-D camera 1402 in FIG. 14), and the two RGB-D cameras are respectively arranged at the middle positions of the upper border and the lower border of the first electronic device. As shown in FIG. 12, the N first cameras may be 24 RGB cameras, and the 24 RGB cameras may be arranged on the upper border and the lower border of the first electronic device 1200. Alternatively, as shown in FIG. 13, the N first cameras may be 12 RGB cameras, and the 12 RGB cameras may be arranged on the upper border of the first electronic device 1300. Alternatively, as shown in FIG. 14, the N first cameras may be 12 RGB cameras, and the 12 RGB cameras may be arranged on the lower border of the first electronic device 1400.

In step 902, the first electronic device transmits the third position information to the second electronic device.

In the video communication scenario, the number of viewpoints entering the eyes of the viewer of the first electronic device is very limited. Therefore, the first electronic device acquires the position information of the eyes of the viewer of the first electronic device, and transmits the third position information information to the second electronic device, which may cause the acquisition terminal to obtain the position of the eyes of the viewer of the display terminal. Thus, the acquisition terminal may select part of cameras of the acquisition terminal for image acquisition according to the position of the eyes of the viewer of the display terminal. In this way, it can ensure that the images acquired by the acquisition terminal meet the viewing requirements of the viewer of the display terminal, and reduce the waste of computer computing power and transmission bandwidth resources.

The order of performing steps 201 to 203 and steps 901 to 902 is not limited in the embodiments of the present disclosure. For example, steps 901 to 902 may be performed after steps 201 to 203, or may be performed before steps 201 to 203, or may be performed simultaneously with steps 201 to 203. FIG. 9 is an exemplary illustration by taking an example in which steps 901 to 902 are performed before steps 201 to 203.

Figure 15:
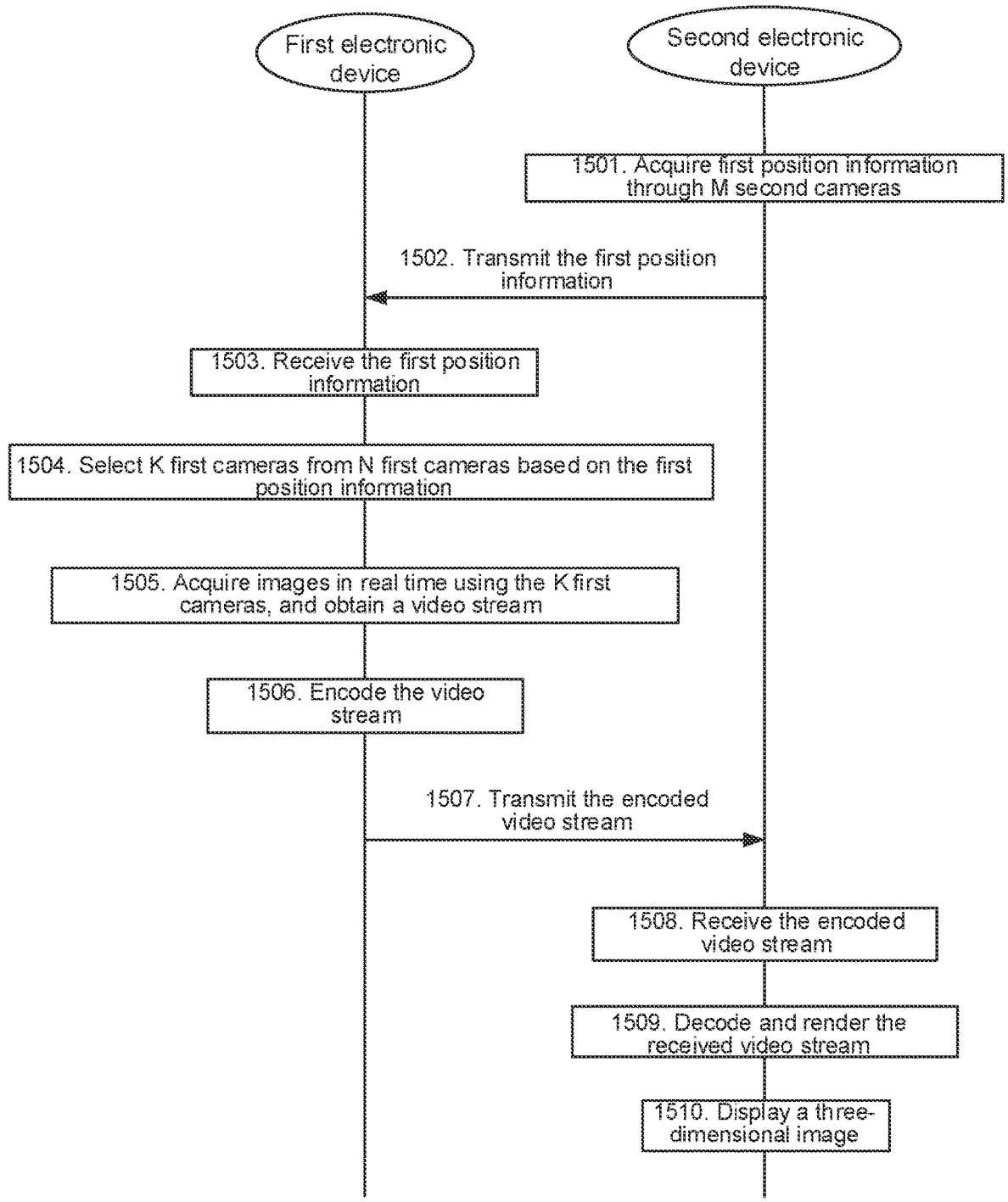
FIG. 15 is a flow diagram of yet another image acquisition method, in accordance with some embodiments.

Some embodiments of the present disclosure further provide an image acquisition method, where a first electronic device is an acquisition terminal and a second electronic device is a display terminal. As shown in FIG. 15, the method includes the following steps.

In step 1501, the second electronic device acquires first position information through M second cameras.

In step 1502, the second electronic device transmits the first position information to the first electronic device.

In step 1503, the first electronic device receives the first position information.

In step 1504, the first electronic device selects K first cameras from N first cameras based on the first position information.

In step 1505, the first electronic device acquires images in real time using the K first cameras and obtains a video stream.

In step 1506, the first electronic device encodes the video stream.

In step 1507, the first electronic device transmits the encoded video stream to the second electronic device.

In step 1508, the second electronic device receives the encoded video stream.

In step 1509, the second electronic device decodes and renders the received video stream.

In step 1510, the second electronic device displays 3D image.

Through the above method, in the first electronic device, when the K first cameras are selected for image acquisition from the N first cameras, the K first cameras are selected based on the first position information, that is, the 3D image viewed by the viewer of the second electronic device is acquired based on the position of the eyes of the viewer of the display terminal. Therefore, the 3D image viewed by the viewer of the second electronic device can satisfy the requirements of the viewer of the second electronic device. Moreover, in the first electronic device, N-K first cameras do not participate in the image acquisition, or the N-K first cameras participate in real-time acquisition, but the first electronic device does not process images acquired by the N-K first cameras. Therefore, data amount of image information acquired by the first electronic device is reduced, which can reduce the waste of computer computing power and transmission bandwidth resources.

Some embodiments of the present disclosure further provide an image acquisition device, and the image acquisition device includes N first cameras, N being an integer greater than or equal to 3. The image acquisition device is configured to: firstly, receive first position information from a second electronic device, the first position information being position information of the eyes of the viewer of the second electronic device; then, select K first cameras from the N first cameras based on the first position information, K being an integer greater than or equal to 2 and less than N; then, acquire images using the K first cameras.

In some embodiments, the image acquisition device is further configured to: based on a projected position of second position information on an upper border and/or a lower border of a display of the image acquisition device, select the K first cameras closest to the projected position from the N first cameras, the second position information being a corresponding position of the first position information on a display of a first electronic device. The image acquisition device is used as the first electronic device (e.g., the first electronic device 300 shown in FIG. 3B), and the display of the image acquisition device is the display of the first electronic device (e.g., the display 310 of the first electronic device 300 shown in FIG. 3B).

In some embodiments, the image acquisition device further includes the display, and the display is divided into J triangular regions by the N first cameras, J being an integer greater than or equal to N. When the second position information is located in a first region in the J triangular regions, the K first cameras are first cameras located at three vertices of the smallest triangular region that includes the first region.

In some embodiments, the image acquisition device further includes M second cameras, M being an integer greater than or equal to 1. The image acquisition device is further configured to: firstly, acquire third position information through the M second cameras, the third position information being position information of the eyes of the viewer of the image acquisition device; then, transmit the third position information to the second electronic device.

In some embodiments, the N first cameras are arranged on the upper border and/or the lower border of the display.

In some embodiments, the M second cameras are arranged at the middle position of the upper border and/or the lower border of the first electronic device.

In some embodiments, the N first cameras include at least one of color cameras or depth cameras.

In some embodiments, the second camera is a depth camera, and the M second cameras include at least one of time-of-flight cameras, binocular stereo cameras, or structured light stereo cameras.

Figure 16:
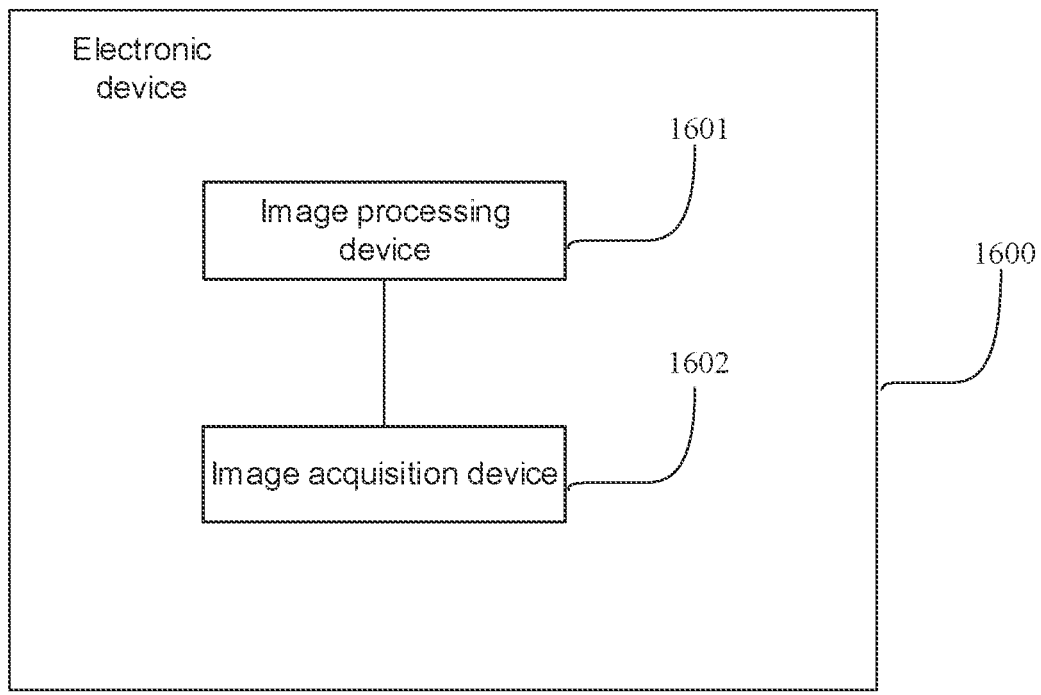
FIG. 16 is a structural diagram of an electronic device, in accordance with some embodiments.

Some embodiments of the present disclosure further provide an electronic device. As shown in FIG. 16, the electronic device 1600 includes an image processing device 1601 and an image acquisition device 1602. The image acquisition device 1602 is used to execute the image acquisition method shown in FIG. 2, 9 or 15, and the image processing device 1601 is configured to process the image information acquired by the image acquisition device 1602.

Some embodiments of the present disclosure provide a computer-readable storage medium (for example, a non-transitory computer-readable storage medium), the computer-readable storage medium has stored computer program instructions, and the computer program instructions, when executed on a computer (for example, an electronic device), cause the computer to perform the image acquisition method according to any of the above embodiments.

For example, the computer-readable storage medium may include, but is not limited to, a magnetic storage device (for example, a hard disk, a floppy disk, a magnetic tape, or the like), an optical disk (for example, a compact disk (CD), a digital versatile disk (DVD), etc.), a smart card, and a flash memory device (for example, an erasable programmable read-only memory (EPROM), a card, a stick, or a key drive board). The various computer-readable storage media described in present disclosure may represent one or more devices and/or other machine-readable storage media for storing information. The term "machine-readable storage medium" may include, but is not limited to, wireless channels and various other media capable of storing, containing, and/or carrying instructions and/or data.

Some embodiments of the present disclosure provide a computer program product. The computer program product includes computer program instructions that, when run on a computer (e.g., an electronic device), cause the computer to perform the image acquisition method as described in any of the above embodiments.

Some embodiments of the present disclosure further provide a computer program. When the computer program is executed on a computer (e.g., an electronic device), the computer program causes the computer to perform the image acquisition method as described in any of the above embodiments.

Beneficial effects of the computer-readable storage medium, the computer program product, and the computer program are same as the beneficial effects of the image acquisition method as described in any of some embodiments described above, and details will not be repeated here.

The foregoing descriptions are merely specific implementation manners of the present disclosure, but the protection scope of the present disclosure is not limited thereto.

Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. An image acquisition method applied to a first electronic device, the first electronic device including N first cameras, N being an integer greater than or equal to 3, the image acquisition method comprising:
   receiving, by the first electronic device, first position information from a second electronic device, the first position information being position information of eyes of a viewer of the second electronic device;
   selecting, by the first electronic device, K first cameras from the N first cameras based on the first position information, K being an integer greater than or equal to 2 and less than N; and
   acquiring, by the first electronic device, images by using the K first cameras; wherein
   selecting, by the first electronic device, the K first cameras from the N first cameras based on the first position information, includes:
   based on a projected position of second position information on an upper border and/or a lower border of the first electronic device, selecting, by the first electronic device, the K first cameras closest to the projected position from the N first cameras, wherein the second position information is a corresponding position of the first position information on a display of the first electronic device.

2. The image acquisition method according to claim 1, wherein
   the display of the first electronic device is divided into J triangular regions by the N first cameras, J being an integer greater than or equal to N; when the second position information is located in a first region in the J triangular regions, the K first cameras are first cameras located at three vertices of a smallest triangular region that includes the first region.

3. An image acquisition method applied to a first electronic device, the first electronic device including N first cameras and M second cameras, N being an integer greater than or equal to 3 and M being an integer greater than or equal to 1, the image acquisition method comprising:
   receiving, by the first electronic device, first position information from a second electronic device, the first position information being position information of eyes of a viewer of the second electronic device;
   selecting, by the first electronic device, K first cameras from the N first cameras based on the first position information, K being an integer greater than or equal to 2 and less than N; and
   acquiring, by the first electronic device, images by using the K first cameras; and
   the image acquisition method further comprising:
   acquiring, by the first electronic device, third position information through the M second cameras, the third position information being position information of eyes of a viewer of the first electronic device; and
   transmitting, by the first electronic device, the third position information to the second electronic device.

4. The image acquisition method according to claim 1, wherein the N first cameras are arranged on the upper border and/or the lower border of the first electronic device.

5. The image acquisition method according to claim 3, wherein the M second cameras are arranged at a middle position of the upper border and/or the lower border of the first electronic device.

6. The image acquisition method according to claim 1, wherein the N first cameras include at least one of color cameras or depth cameras.

7. The image acquisition method according to claim 3, wherein the M second cameras are depth cameras, and the M second cameras include at least one of time-of-flight cameras, binocular stereo cameras or structured light stereo cameras.

8. An image acquisition device, comprising N first cameras, N being an integer greater than or equal to 3, wherein the image acquisition device is configured to:
   receive first position information from a second electronic device, the first position information being position information of eyes of a viewer of the second electronic device;
   select K first cameras from the N first cameras based on the first position information, K being an integer greater than or equal to 2 and less than N; and
   acquire images by using the K first cameras;
   wherein the image acquisition device is configured to:
   based on a projected position of second position information on an upper border and/or a lower border of a display of the image acquisition device, select the K first cameras closest to the projected position from the N first cameras, the second position information being a corresponding position of the first position information on the display of the image acquisition device.

9. The image acquisition device according to claim 8, further comprising the display, the display being divided into J triangular regions by the N first cameras, J being an integer greater than or equal to N; wherein when the second position information is located in a first region in the J triangular regions, the K first cameras are first cameras located at three vertices of a smallest triangular region that includes the first region.

10. The image acquisition device according to claim 8, further comprising M second cameras, M being an integer greater than or equal to 1; wherein the image acquisition device is further configured to:
    acquire third position information through the M second cameras, the third position information being position information of eyes of a viewer of the image acquisition device; and
    transmit the third position information to the second electronic device.

11. The image acquisition device according to claim 9, wherein the N first cameras are arranged on the upper border and/or the lower border of the display of the image acquisition device.

12. The image acquisition device according to claim 10, wherein the M second cameras are arranged at a middle position of an upper border and/or a lower border of the image acquisition device.

13. The image acquisition device according to claim 8, wherein the N first cameras include at least one of color cameras or depth cameras.

14. The image acquisition device according to claim 10, wherein the M second cameras are depth cameras, and the M second cameras include at least one of time-of-flight cameras, binocular stereo cameras or structured light stereo cameras.

15. An electronic device, comprising an image processing device and the image acquisition device according to claim 8;
  the image processing device being configured to:
  process image information acquired by the image acquisition device.

16. A non-transitory computer-readable storage medium having stored computer program instructions, wherein the computer program instructions, when run on a computer, cause the computer to perform the image acquisition method according to claim 1.

17. A computer program product, comprising computer program instructions stored on a non-transitory computer-readable storage medium, wherein the computer program instructions, when executed on a computer, cause the computer to perform the image acquisition method according to claim 1.

18. The image acquisition method according to claim 1, wherein the first electronic device further includes M second cameras, M being an integer greater than or equal to 1; the image acquisition method further comprises:
  acquiring, by the first electronic device, third position information through the M second cameras, the third position information being position information of eyes of a viewer of the first electronic device; and
  transmitting, by the first electronic device, the third position information to the second electronic device.

* * * * *